United States Patent
Rupanagunta et al.

(10) Patent No.: US 7,804,840 B2
(45) Date of Patent: Sep. 28, 2010

(54) COMBINED FCOE NETWORK DEVICE

(75) Inventors: Sriram Rupanagunta, Costa Mesa, CA (US); Sriharsha Jayanarayana, Costa Mesa, CA (US); Parav Pandit, Costa Mesa, CA (US); Amar Kapadia, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 102 days.

(21) Appl. No.: 12/207,070

(22) Filed: Sep. 9, 2008

(65) Prior Publication Data

US 2010/0061383 A1 Mar. 11, 2010

(51) Int. Cl.
*H04L 12/28* (2006.01)
*H04L 12/56* (2006.01)
*H04J 3/16* (2006.01)
*H04J 3/22* (2006.01)

(52) U.S. Cl. ........................ 370/401; 370/466
(58) Field of Classification Search ................. 370/401, 370/465, 466
See application file for complete search history.

(56) References Cited

U.S. PATENT DOCUMENTS

| | | | |
|---|---|---|---|
| 2005/0226201 A1* | 10/2005 | McMillin | 370/348 |
| 2006/0245568 A1* | 11/2006 | Son | 379/211.01 |
| 2008/0056300 A1* | 3/2008 | Williams | 370/466 |

* cited by examiner

*Primary Examiner*—Ronald Abelson
(74) *Attorney, Agent, or Firm*—Morrison & Foerster LLP (57) ABSTRACT

Embodiments of the present invention are related to a device and a method for more efficiently processing Ethernet communications that include FCOE communications. In some embodiments the device is a single device including a combination of an aggregator, a filter and a gateway. Such a combination can be more practical, affordable and efficient than the usual arrangement of a several separate devices. In other embodiments, the device of the present invention can be a combination of a switch and a gateway. In yet other embodiments other types of devices can be used. More generally, embodiments of the present invention can apply to a device or method for processing communications involving a set of two network protocols (first and second protocols) as well as a third protocol, the third protocol being compatible with the first protocol and used to define how to tunnel the second protocol over the first protocol.

20 Claims, 5 Drawing Sheets

COMBINED FCOE NETWORK DEVICE

FIELD OF THE INVENTION

This generally relates to networks and more specifically to connecting two networks of different types.

BACKGROUND OF THE INVENTION

Ethernet is a known type of networking protocol. Ethernet networks are often used for general purpose Internet, LAN and WAN networking. Fibre Channel (FC) is another known networking protocol. Fibre Channel networks are often used for storage networks, such as storage area networks (SANs).

Traditionally Fibre Channel networks are preferred to Ethernet networks for storage applications because of their high throughput and guaranteed delivery of frames. Thus, certain types of computers may be connected to two different networks—a Fibre Channel network for storage access (e.g., access to networked storage devices, such as hard drives RAID arrays, etc.) and an Ethernet network for most other networking functionalities. For example, many existing internet servers include such a dual network configuration.

Converged Enhanced Ethernet (CEE) is a new type of Ethernet networking protocol intended to provide higher throughput and reliability. It has been suggested that a CEE network satisfies the higher requirements for storage networking and can be used to replace existing Fibre Channel networks. However, since much existing storage technology has been designed according to the Fibre Channel protocol, it is considered desirable to have CEE components operate in conjunction with FC components in storage networks instead of completely replacing them. For that purpose the Fibre Channel over Ethernet (FCoE) protocol was developed. FCoE provides for "wrapping" FC frames in Ethernet frames and transmitting them over an Ethernet network (this is also referred to as tunneling of the FC protocol over the Ethernet protocol). While FCoE was originally designed in view of CEE networks it can be used for other types of Ethernet networks.

It is generally considered preferable to at least partially migrate storage networking traffic to CEE networks through the use of FCoE because CEE networks can handle other types of networking traffic as well. Thus, only one network can be used for setups which previously required at least two different types of networks.

FCoE allows for relatively easy transitions between CEE or other Ethernet networks and FC networks. More specifically, a gateway can be placed between an Ethernet network and an FC network (this type of gateway is sometimes referred to as an FCoE gateway). The gateway can wrap FC frames received from the FC network into Ethernet frames according to the FCoE protocol and send the wrapped frames to the Ethernet network. It can also unwrap FCoE Ethernet frames received from the Ethernet network to obtain resulting FC frames which it can send to the FC network. Thus, the gateway can allow an FC and Ethernet networks to be connected to each other. Of course, for the type of gateway discussed above to operate properly, it should receive only FCoE frames from the Ethernet network. If it receives a non-FCoE frame, it cannot convert that frame into a meaningful FC frame.

Various networks (including Ethernet and FC networks) can include different types of networking elements, such as switches, routers, hubs, etc. A switch is a relatively complex element which may include several ports. The switch examines incoming frames and sends them to various ports according to the destination addresses included in the frames. A hub is a relatively simple device. It usually does not examine any addresses within incoming frames. Instead it sends all received incoming frames out to all ports regardless of what their destination address is. The hub relies on other devices on the network to discard frames which are not addressed to them. A switch is considered a "smart" device and a hub a "dumb" device. A switch is usually more efficient than a hub in terms of network utilization because it does not send out unnecessary frames. A hub, however, is usually cheaper and easier to manage.

A network can include a number of switches, hubs and gateways. The large number of networking elements in a network can make the network expensive and difficult to manage. It is therefore considered desirable to reduce the number of networking elements in a network without reducing the network's functionality.

SUMMARY OF THE INVENTION

Embodiments of the present invention are related to a device and a method for more efficiently processing Ethernet communications that include FCOE communications. In some embodiments the device is a single device including a combination of a hub (or aggregator), a filter and a gateway. Such a combination can be more practical, affordable and efficient than the usual arrangement of a several separate devices (usually including a hub, a switch and a gateway). In some embodiments, the device of the present invention can be a combination of a switch and a gateway. In some embodiments other types of devices can be used.

The aggregator can receive Ethernet communications that include some FCoE communications. The aggregator can send all these communications to an Ethernet network and to a filter. The filter can filter out the FCoE communications from the received Ethernet communications and send them to a gateway. The gateway can convert the FCoE communications into FC communications and send them to an FC network.

Alternatively, a switch can receive Ethernet communications that include FCoE communications. The switch can send the FCoE communications to a gateway, and send the non-FCoE Ethernet communications to an Ethernet network (thus, the switch would segregate the FCoE from non-FCoE communications). The gateway may again convert the received FCoE communications into FC communications and send them to an FC network.

More generally, embodiments of the present invention can apply to a device or method for processing communications involving a set of two network protocols (first and second protocols) as well as a third protocol, the third protocol being compatible with the first protocol and being used to define how to tunnel the second protocol over the first protocol.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

Embodiments of the present invention are related to a device and a method for more efficiently processing Ethernet communications that include FCOE communications. In some embodiments the device is a combination of a hub (or aggregator), a filter and a gateway. Such a combination can be more practical, affordable and efficient than the usual arrangement of a several separate devices (usually including a hub, a switch and a gateway). In some embodiments, the device of the present invention can be a combination of a switch and a gateway. In some embodiments other types of devices can be used.

Although embodiments of the invention are described and illustrated herein in terms of the use of Ethernet, Fibre Channel and FCoE networks, the invention is not thus limited. The invention can be used in connection with any system in which two networks featuring two different network protocols are connected. Furthermore, while embodiments of the invention are described herein as combinations of two or more devices, such as a hub a filter and a gateway, the invention is not thus limited but may include embodiments that do not include these devices but feature circuitry and/or computer executable instructions that are configured to operate in a similar manner. Also, while the embodiments discussed below are primarily associated with blade servers and blade server enclosures, embodiments of the present invention can operate in conjunction with other types of devices.

Figure 1:
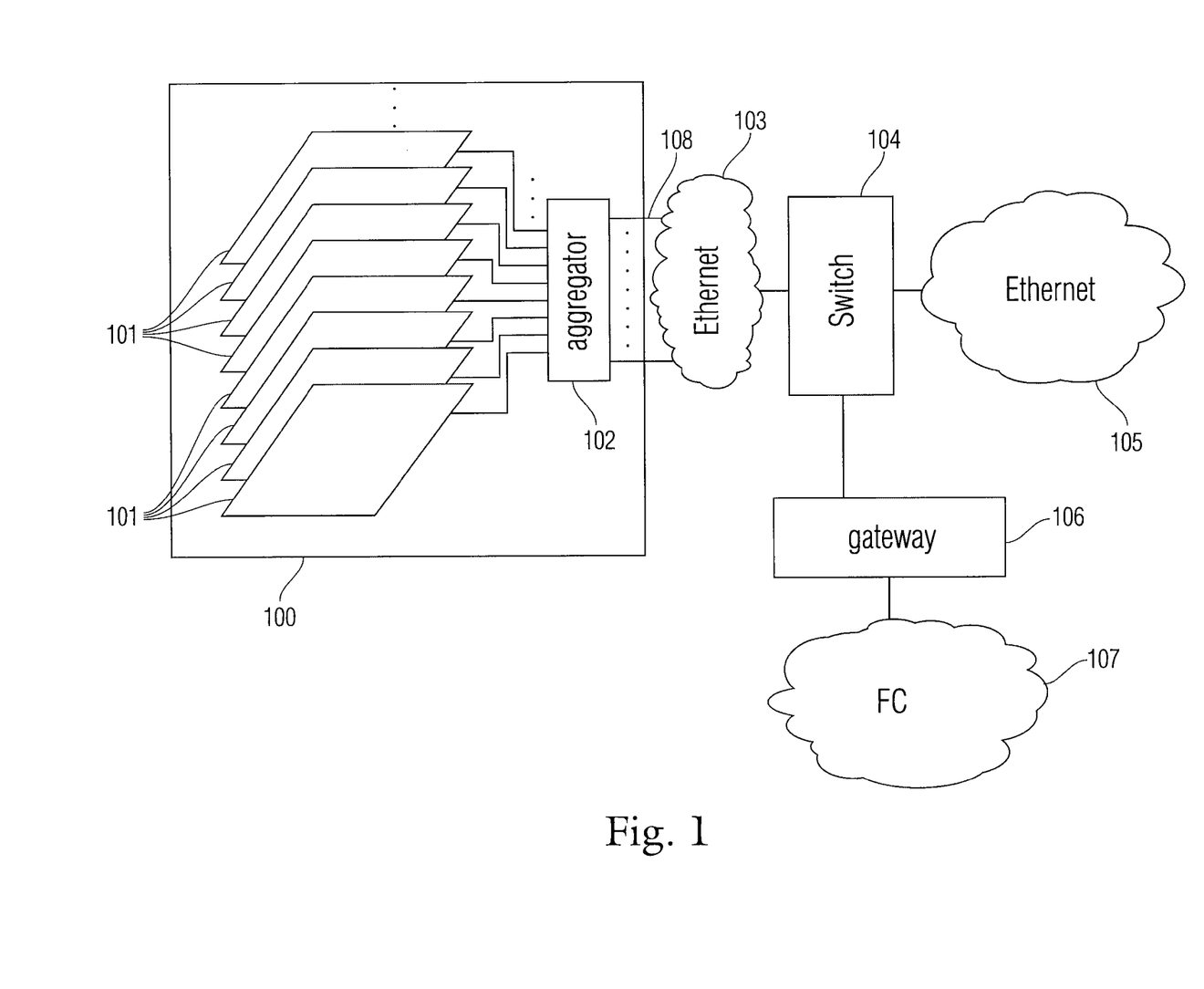
FIG. 1 is a diagram of an exemplary blade server rack connected to Ethernet and Fibre Channel networks.

FIG. 1 is a diagram of an exemplary blade server system attached to an Ethernet and Fibre Channel networks. Blade enclosure (or rack) 100 can include several blade servers 101. Blade servers 101 can be individual distinct computers, each provided on a separate printed circuit board. In some cases, there may be two or more computers on each board. The number of blades may differ for different types of blade racks. One existing type supports up to 14 blade servers.

The blade servers are connected through network connections to aggregator 102. As noted above, aggregator 102 may also be referred to as a hub. Aggregator 102 can be an Ethernet aggregator. The aggregator may connect to Ethernet network 103. In some cases, the aggregator may connect to Ethernet network 103 through multiple physical links 108. In some cases, the links are of a number slightly smaller than the number of blades. For example for a 14 blade enclosure, 10 links can be used. The links may connect to various elements within network 103, such as switches, hubs etc.

Switch 104 is connected to network 103. Switch 104 can also be connected to various other elements, such as Ethernet network 105 and gateway 106. In some cases, Ethernet networks 103 and 105 and switch 104 can be a part of a single network. In some cases, Ethernet network 103 may not exist and switch 104 can be directly connected to the multiple links of aggregator 102.

Gateway 106 can be an Ethernet/Fibre Channel gateway or an FCoE gateway. It can connect to an Ethernet network through switch 104 and to a Fibre Channel network 107. Gateway 106 can receive FCoE packets (i.e., Ethernet packets enclosing FC packets according to the FCoE protocol) from switch 104. The gateway can extract the FC packets from the incoming FCoE packets and send the FC packets to FC network 107. Similarly the gateway 106 can wrap incoming FC packets from FC network 107 into Ethernet packets according to the FCoE protocol and sends them to switch 104. FC network 107 can be, for example, a storage area network (SAN).

The system of FIG. 1 can be used to simplify the network connections within blade enclosure 100. Blades 101 may require access to Ethernet 105 as well as to FC network 107. For example, blades 101 may access FC network 107 for storage and Ethernet network 105 for Internet access. In some more traditional systems, blades 101 would each feature two distinct network controllers (one for Ethernet and one for Fibre Channel) and would each be connected to the two types of networks. On the other hand, the system of FIG. 1 provides that the blade servers 101 are FCoE enabled (or at least include network adapters that are FCoE enabled). Thus, the blade servers can wrap FC communications in FCoE packets and send them through an Ethernet aggregator 102 and other Ethernet components (i.e., switch 104) to the FC network 107. Therefore, blade servers 101 can use the same set of links and the same blade enclosure network element (i.e., aggregator 102) for Ethernet and FC communications. Thus, the system of FIG. 1 removes the need for additional network connections and network elements thus improving the overall cost of the blade servers.

In some cases, aggregator 102 and switch 104 are CEE enabled devices and blade servers 101 communicate according to the CEE protocol. This may be beneficial because CEE is often considered to feature the speed and reliability necessary for FCoE communications. In other cases these can be ordinary Ethernet devices, or may operate according to another type of improved Ethernet protocol.

However, the system of FIG. 1, while beneficial over some traditional systems still has some disadvantages. Namely, the requirement for an aggregator, switch and a gateway, generally adds to the cost and the complexity of the network. Also, the relatively complex interconnections add to the installation and maintenance costs of the network as these devices (especially the switch 104) have to be carefully configured before use. Furthermore, in the system of FIG. 1, the blade rack 100 cannot be easily placed in most existing server rooms because it requires a specific configuration of the network it is connected to (i.e., the configuration shown in FIG. 1), which is not present in most existing server rooms. Thus, using the blade rack of FIG. 1 may require at least partial reconfiguration of the network in a server room.

Figure 2:
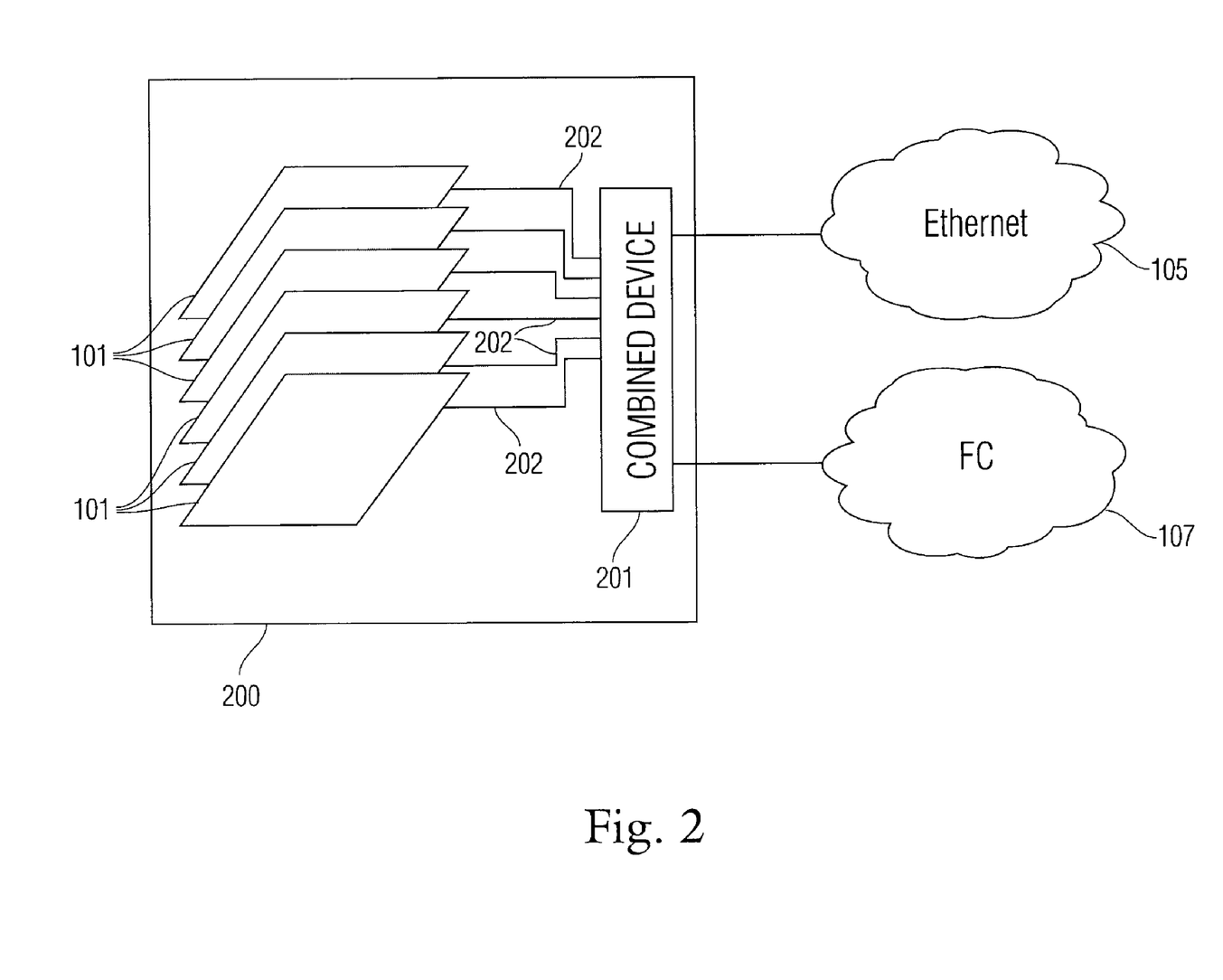
FIG. 2 is a diagram of an exemplary blade server rack connected to Ethernet and Fibre Channel networks according to embodiments of the present invention.

FIG. 2 is an exemplary diagram of a blade server rack according to some embodiments of the present invention. The blade server rack includes several blade servers 101. Although only 6 are shown, other numbers of blade servers can be provided (Such as, for example 12 or 14 blade servers). The blade servers 101 are connected to a combined device 201 through Ethernet connections 202. Thus, as is the case for the system of FIG. 1, the blade servers need not include separate adapters and connections for Fibre Channel. Instead the blade servers may perform Fibre Channel communications through the FCoE protocol (i.e., by sending and receiving FC frames wrapped in Ethernet packets). The Ethernet connections between the blade servers and the combined device can be ordinary Ethernet connections, CEE connections or other types of Ethernet connections.

The combined device 201 is a device that processes communications to and from the blade servers 101. The combined device forwards non-FCoE communications received from servers 101 to Ethernet network 105. Similarly, it forwards communications received from Ethernet network 105 to the servers 101. Ethernet network can be a CEE network, an ordinary Ethernet network or another type of enhanced Ethernet network.

The combined device 201 handles FCoE communications by converting them to associated FC communications (i.e., unwrapping the FC frames from the FCoE Ethernet frames) and sending them to FC network 107. Similarly, the combined device receives FC communications from network 107 and converts them to FCoE communications (i.e., by wrapping FC frames into Ethernet frames according to the FCoE protocol) and sends the FCoE communications to blade servers 101 through Ethernet links 202.

In some embodiments, the combined device can be attached to the two networks through multiple links. This may allow the combined device to handle the traffic of the blade servers 101. For example, in an embodiment with 14 blade servers, the combined device can connect to networks 105 and 107 through four links each.

The embodiment of FIG. 2 provides several advantages over existing systems. The combined device is a single device and thus, easier to manufacture than multiple separate devices, such as a separate hub, switch and a gateway as shown in FIG. 1. Furthermore, since it is a single device, the combined device is also easier to configure and maintain than a group of two or more separate devices. Some embodiments provide for further efficiencies of manufacture by avoiding the use of complex elements, such as switches. Furthermore, the combined device can be entirely contained within the blade enclosure 200. Thus, other network components of a standard blade environment center need not be changed. The enclosure featuring the combined device can connect directly to an Ethernet and Fibre Channel network as is the case for many standard blade server enclosures. Thus, embodiments of the present invention allow for a "drop in" blade enclosure that can be placed in and connected to standard server room networks without the need for modification of said networks, while allowing for blade servers that do not require a separate FC adapter.

While the combined device of FIG. 2 is shown as part of the blade enclosure, it can be provided as a standalone device connected to but separate from any blade enclosure. Furthermore, the combined device can be used in combination with another type of device that is not a blade server enclosure.

Figure 3:
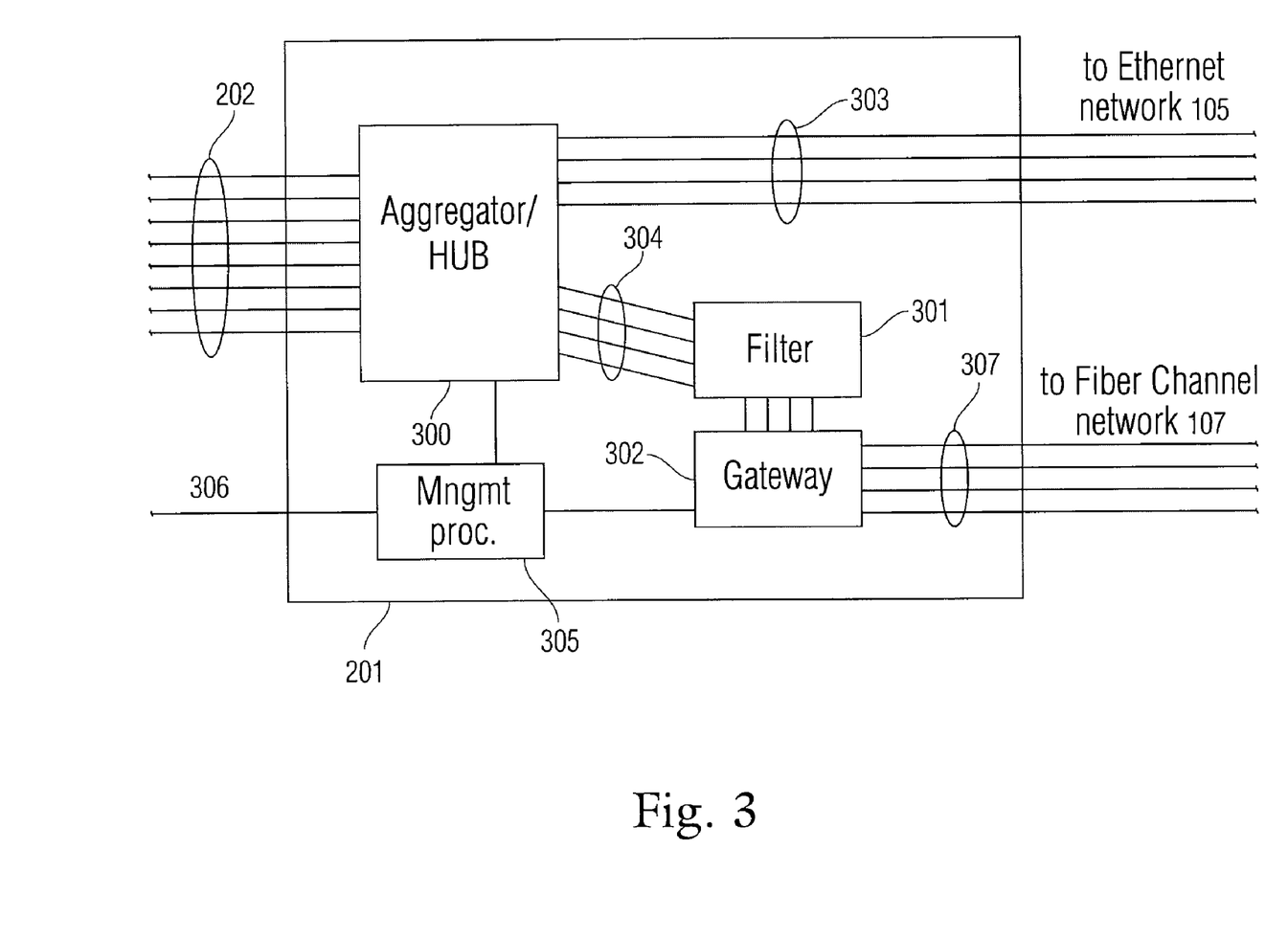
FIG. 3 is a diagram of an exemplary combined device according to some embodiments of the invention.

FIG. 3 is a diagram of an exemplary combined device according to some embodiments of the invention. Combined device 201 includes an aggregator (or hub) 300. The aggregator is connected to the blade servers through multiple Ethernet connections 202. The aggregator is also connected to the Ethernet network 105 through connections 303 and to filter 301 through connections 304. Connections 303 and 304 can include multiple connections in order to handle high amounts of network traffic.

The aggregator is not a switch so it does not resolve addresses. Instead, it simply repeats all received messages to all its connections. In some embodiments, the aggregator may be configured so that it only repeats incoming messages to some connections, depending on which connections specific messages were received. For example, the aggregator may be configured not to repeat messages coming in from one of connections 202 to other ones of connections 202. Furthermore, the aggregator may be configured not to repeat incoming messages from one of connections 303 to other connections 303 or connections 304 and incoming messages from one of connections 304 to other connections 304 or connections 303. Also, messages sent to connections 303 and 304 need only be sent to a single one of these connections. However, even if it is thus configured, the aggregator may operate simply based on the connections incoming messages are received from and not based on addressing within messages. Thus, aggregator 300 is not able to separate non-FCoE Ethernet packets addressed to Ethernet network 105 from FCoE packets addressed to FC network 107 when either of these types of packets are received from connections 202. Instead the aggregator may send both of these types of packets to both networks 105 and 107.

Filter 301 may filter out messages received from the aggregator 300 that are not FCoE messages. In some embodiments, the filter may perform this by examining the addresses of incoming frames and allow only frames addressed to gateway 302. In other embodiments, the filter may simply examine the headers of the incoming Ethernet frames to determine whether these frames are marked as FCoE frames. (The latter embodiment can result in a relatively low cost filter.) Thus, the filter ensures that only FCoE frames are sent to gateway 302.

Gateway 302 converts FCoE frames coming from filter 301 into FC frames and sends the FC frames to Fibre channel network 107 through connections 307. Similarly, the gateway receives FC frames incoming from network 107, converts them into FC frames and sends them to aggregator 300 through filter 301 (the filter need not perform any filtering in the gateway to aggregator direction).

Management processor 305 handles the configuration and management of the combined device 201. It may be connected to the aggregator, filter and gateway, and perform management, configuration, error detection, logging, etc., for these elements. The management processor can also load firmware of one or more of elements 300-302. Furthermore, the management processor may be connected to an external device through link 306 in order to receive configuration information, firmware and/or various management commands, and to send status or error information, logs or other statistics to/from an external management device or application. In alternative embodiments, the management processor can communicate with the external management device or application through aggregator 300 and connections 202, 303 and/or 307.

The embodiment of FIG. 3 is cost efficient, because it combines several different network devices that would usually be necessary to separate non-FCoE and FCoE communications and convert the FCoE communications into FC communications into a single device. Thus, various costs associated with building multiple devices, cabling, etc. can be avoided. Furthermore, configuration and maintenance of the single combined device 201 may be much simpler and more cost efficient than that of multiple separate devices. The embodiment of FIG. 3 possesses an additional advantage in that it does not require a relatively costly switch. Instead a combination of two relatively low cost elements (aggregator 300 and filter 301) serves to route the FCoE packets to the gateway 302.

In some embodiments certain elements of the combined device 201 can be combined. Thus, for example, aggregator 300 can also perform the functionality of filter 301. Alternatively, gateway 302 can perform the functionality of filter 301.

The various elements of combined device 201 can be implemented as one or more integrated circuits (i.e., chips) on a single printed circuit board (PCB). Thus, internal links between the various elements (such as link 304) can be implemented through PCB traces instead of more expensive cables. This can improve the overall cost and speed of the combined device. Elements 300, 301, 302 and 305 can be implemented on separate chips. Alternatively, two or more elements can be combined on a single chip.

The gateway 302 may be implemented on an EMULEX AV250 "RAPTOR" ASIC. The aggregator and filter can be implemented on various available programmable circuits. Alternatively, the aggregator and filter can be implemented as one or two custom designed ASICs.

Figure 4:
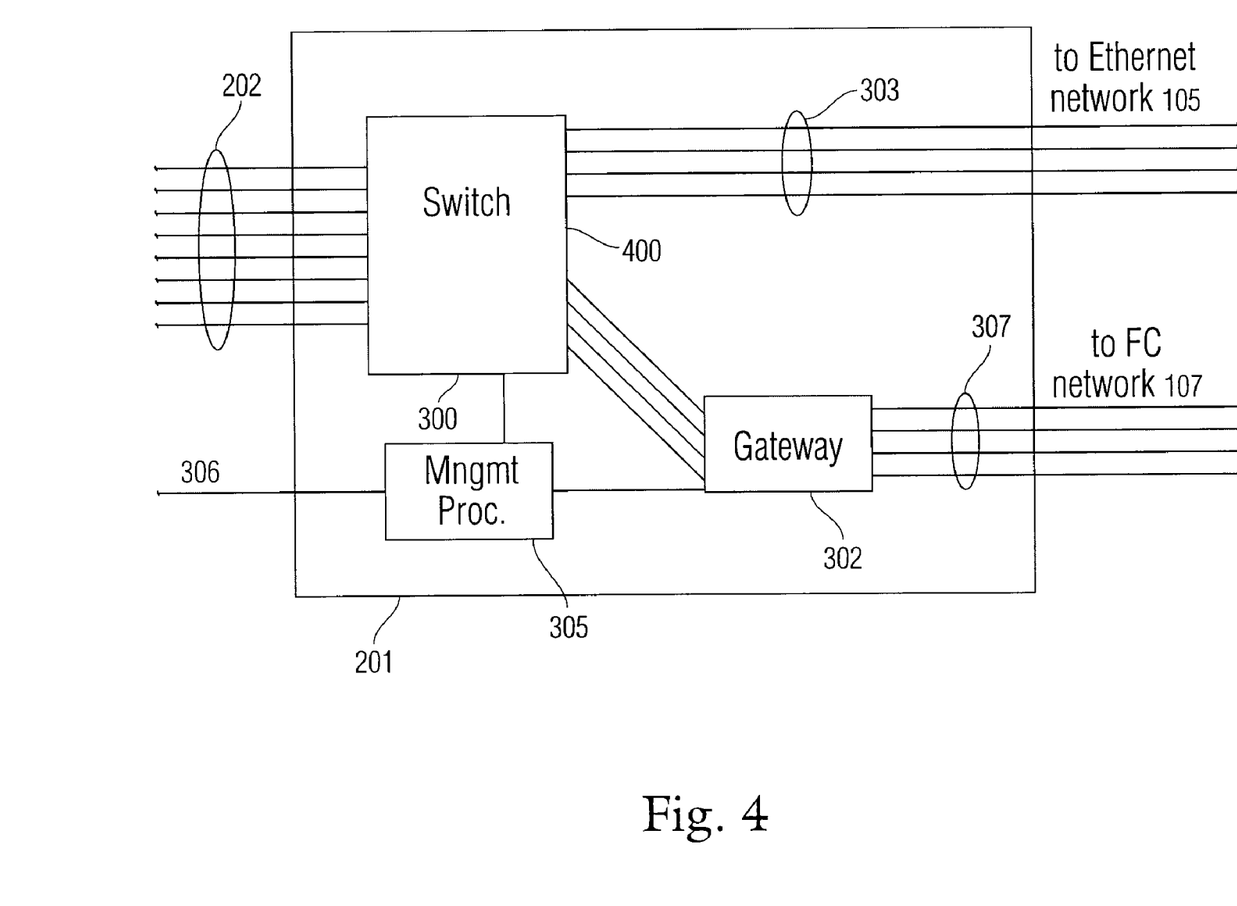
FIG. 4 is a diagram of another exemplary combined device according to some embodiments of the invention.

FIG. 4 is a diagram of another exemplary combined device according to some embodiments of the invention. The combined device of FIG. 4 is similar to the one of FIG. 3. The major difference is that the device 201 of FIG. 4 uses a switch 400 instead of an aggregator and a filter. The switch can resolve addresses of incoming communications and send to gateway 302 only communications addressed to it. It is expected that all FCoE communications received from the blade servers through links 202 are addressed to the gateway. Thus, the switch sends only FCoE communications to the gateway 302. Therefore, a filter need not be used.

The embodiment of FIG. 4 may be more costly than that of FIG. 3, because it uses a switch. However, the embodiment of FIG. 4 would still feature the cost savings resulting from the fact that the switch and the gateway are combined in a single element and placed at the blade enclosure. Furthermore, the embodiment of FIG. 4 may be more efficient in high traffic applications. In such applications, the aggregator of FIG. 3 may create too much excess traffic by repeating received frames to multiple connections instead of sending them to a single connection based on their addresses.

Figure 5:
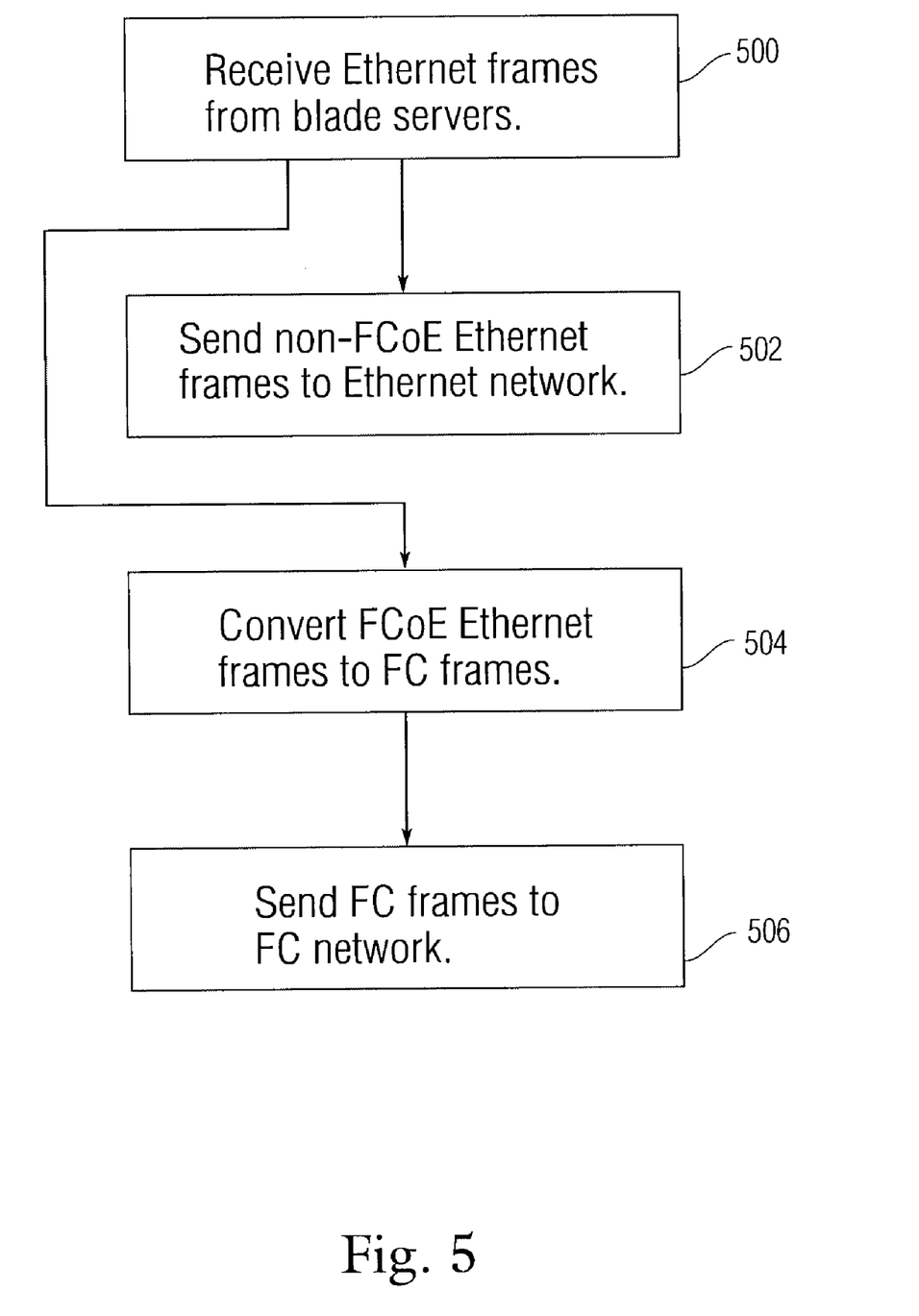
FIG. 5 is a flow chart showing an exemplary method of operation of combined device 201.

FIG. 5 is a flow chart showing an exemplary method of operation of combined device 201. At step 500, the combined device receives some Ethernet frames from the blade servers 101. The Ethernet frames may include FCoE and/or non-FCoE Ethernet frames. At step 502, the non-FCoE frames are sent to an Ethernet network. In step 504, the FCoE frames are converted to FC frames. In step 506, the FC frames are sent to an FC network. Step 502 can be performed before, after or concurrently with steps 504 and 506. The method of FIG. 5 can be performed by any of the combined devices discussed above (including those of FIGS. 3 and 4) as well as other types of combined devices.

While embodiments discussed above are related to Ethernet, Fibre Channel and FCoE protocols, the present invention is not thus limited. A person of skill in the art would recognize that the teachings discussed above can be applied to other types of network protocols. In general, the teachings above can be applied to various pairs of network protocols, as long as it is possible to tunnel one of these protocols over the other. Thus, embodiments of the present invention can apply to a set of two generic network protocols (first and second protocols) as well as a third protocol, the third protocol being compatible with the first protocol and being used to define how to tunnel the second protocol over the first protocol. In the examples discussed above, the first protocol can be Ethernet (or CEE), the second one FC, and the third one FCoE.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for processing a set of Ethernet communications including Fibre over Ethernet (FCoE) communications and non-FCoE communications comprising:
   receiving the set of Ethernet communications;
   sending a set of non-FCoE communications from the set of Ethernet communications to an Ethernet network;
   converting a set of FCoE communications from the set of Ethernet communications into a set of Fibre Channel (FC) communications;
   sending the set of FC communications to a FC network;
   receiving a second set of FC communications;
   converting the second set of FC communications into a second set of FCoE communications; and
   sending the second set of FCoE communications to one or more devices,
   wherein the entire method is performed at a single device including an aggregator, a filter and a gateway.

2. The method of claim 1, wherein the receiving of the set of Ethernet communications includes receiving the set of Ethernet communications from one or more blade servers.

3. The method of claim 1, wherein the converting a set of FCoE communications further comprises:
   sending the entire set of Ethernet communications to the filter;
   selecting the set of FCoE communications from the entire set of Ethernet communications by the filter;
   sending the set of FCoE communications to the gateway by the filter; and
   converting the set of FCoE communications into a set of FC communications by the gateway.

4. A device for processing incoming Ethernet communications, the device being connected to
   one or more source devices,
   an Ethernet network, and
   a Fibre channel (FC) network, the device comprising:
   an aggregator configured to receive a set of Ethernet communications from the one or more source devices, send the set of Ethernet communications to the Ethernet network and to a filter;
   the filter configured to receive the set of Ethernet communications from the aggregator, select a first set of FCoE communications from the set of Ethernet communications, and send the first set of FCoE communications to a gateway; and
   the gateway configured to receive the first set of FCoE communications from the filter; convert the first set of FCoE communications into a set of FC communications, send the FC communications to the FC network; receive a second set of FC communications from the FC network, convert the second set of FC communications into the second set of FCoE communications, and forward the second set of FCoE communications to the aggregator to be forwarded by the aggregator to the one or more source devices.

5. The device of claim 4, wherein the one or more source devices are one or more blade servers.

6. The device of claim 4, wherein the Ethernet communications are Converged Enhanced Ethernet (CEE) communications.

7. The device of claim 4, wherein the gateway is configured to forward the second set of FCoE communications to the aggregator through the filter.

8. A blade enclosure comprising a plurality of blade servers and the device of claim 4, wherein the plurality of blade servers are the one or more source devices.

9. A networked server system comprising the Ethernet network, the FC network and the blade enclosure of claim 8.

10. A device for processing incoming Ethernet communications, comprising:
   an aggregator connected to one or more source devices, an Ethernet network, and a filter and configured to receive a set of Ethernet communications from the one or more source devices, and send the entire set of Ethernet communications to the Ethernet network and the filter;

the filter connected to the aggregator and a gateway and configured to receive the set of Ethernet communications, and forward a set of Fibre Channel over Ethernet (FCoE) communications to the gateway, the set of FCoE communications being a subset of the set of Ethernet communications; and a gateway connected to the filter and a Fibre Channel (FC) network and configured to receive the set of FCoE communications, convert the set of FCoE communications into a set of FC communications, send the set of FC communications to the FC network, receive a second set of FC communications from the FC network, convert the second set of FC communications into a second set of FCoE communications, and forward the second set of FCoE communications to the aggregator to be forwarded to the one or more source devices.

11. The device of claim 10, wherein the one or more source devices comprise one or more blade servers.

12. The device of claim 10, wherein the Ethernet communications are Converged Enhanced Ethernet (CEE) communications and the Ethernet network is a CEE network.

13. The device of claim 10 further comprising a management processor configured to configure and manage one or more of the aggregator, the filter and the gateway.

14. A blade enclosure comprising a plurality of blade servers and the device of claim 10, wherein the plurality of blade servers are the one or more source devices.

15. A networked server system comprising the Ethernet network, the FC network and the blade enclosure of claim 14.

16. The device of claim 10, wherein the aggregator, filter and gateway are mounted on a single printed circuit board within the device.

17. The device of claim 16, wherein the aggregator, filter and gateway are implemented as part of a single integrated circuit.

18. A blade enclosure comprising a plurality of blade servers and a device for processing incoming Ethernet communications, comprising:

an aggregator connected to the plurality of blade servers, an Ethernet network, and a filter and configured to receive a set of Ethernet communications from the plurality of blade servers, and send the entire set of Ethernet communications to the Ethernet network and the filter;

the filter connected to the aggregator and a gateway and configured to receive the set of Ethernet communications, and forward a set of Fibre Channel over Ethernet (FCoE) communications to the gateway, the set of FCoE communications being a subset of the set of Ethernet communications; and a gateway connected to the filter and a Fibre Channel (FC) network and configured to receive the set of FCoE communications, convert the set of FCoE communications into a set of FC communications, send the set of FC communications to the FC network, receive a second set of FC communications from the FC network, convert the second set of FC communications into a second set of FCoE communications, and forward the second set of FCoE communications to the aggregator to be forwarded to the one or more source devices.

19. A method for processing a set of communications of a first protocol, comprising:

receiving the set of communications of the first protocol;

sending a first set of communications from the set of communications of the first protocol to a network of the first protocol;

converting a second set of communications from the set of communications of the first protocol into a third set of communications of a second protocol;

sending the third set of communications to a network of the second protocol;

receiving from the network a fourth set of communications of the second protocol;

converting the fourth set of communications into a fifth set of communications of the first protocol; and sending the fifth set of communications to one or more devices, wherein the entire method is performed at a single device including an aggregator, a filter and a gateway, wherein the second and fifth sets of communications include includes communications of a third protocol, the third protocol being compatible with the first protocol and being effective to tunnel communications of the second protocol over the first protocol, and wherein the first set of communications does not include communications of the third protocol.

20. A device for processing incoming communications of a first protocol, the device being connected to one or more source devices, a network of the first protocol, and a network, of a second protocol, the device comprising:

an aggregator configured to receive a set of communications in the first protocol from the one or more source devices, and send the set of communications in the first protocol to the network of the first protocol and to a filter;

the filter configured to receive the set communications of the first protocol from the aggregator, select a set communications in a third protocol from the set of communications of the first protocol, and send the set of communications in the third protocol to a gateway; and the gateway configured to receive the set of communications in the third protocol from the filter, convert the set of communications in the third protocol into a set of communications in the second protocol, send the communications in the second protocol to the network of the second protocol, receive a second set of communications of the second protocol from the network of the second protocol, convert the second set of communications of the second protocol into a second set of communications of the third protocol, and forward the second set of communications of the third protocol to the aggregator to be forwarded to the one or more source devices, wherein the third protocol is compatible with the first protocol and is effective to tunnel communications of the second protocol over the first protocol.

* * * * *